Oct. 1, 1940.  J. F. G. CHOBERT  2,216,385
ROTATABLE FASTENING DEVICE
Filed Nov. 21, 1936
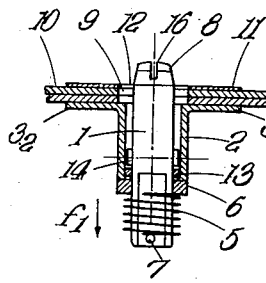
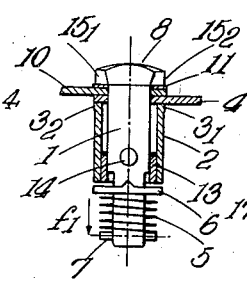
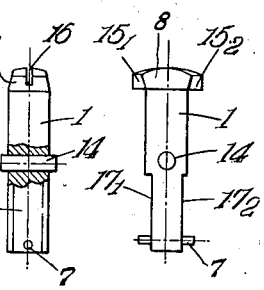
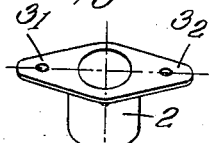
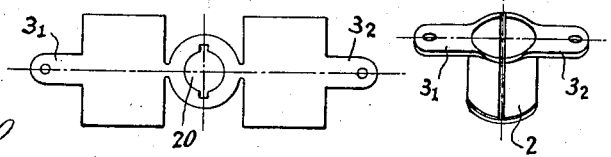
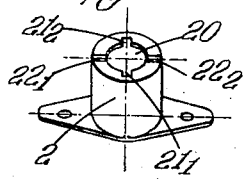
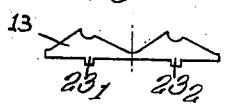
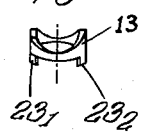
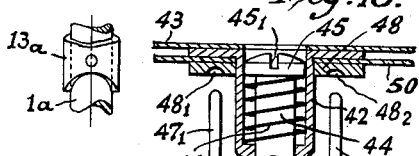
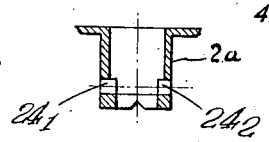
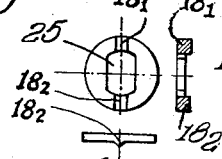
Inventor
Jacques F. G. Chobert
by Wilkinson & Mawhinney
Attorneys.

Patented Oct. 1, 1940

2,216,385

UNITED STATES PATENT OFFICE 2,216,385

ROTATABLE FASTENING DEVICE

Jacques Francois Gabriel Chobert, Saint Etienne, France

Application November 21, 1936, Serial No. 112,180
In France November 28, 1935

4 Claims. (Cl. 24—221)

The present invention relates to an improved fastening device suitable for securing inspection doors, panels and the like used on aircraft, various vehicles and machinery.

An object of the invention is to provide a fastening device which may be rapidly and easily engaged and disengaged and may be mounted near to the edge of the inspection panel or the like.

According to this invention a fastening device for securing together overlapping elements by pressing surfaces of said elements into contact with each other comprises a socket for attachment to one of said elements, a manually operable member mounted for rotational and endwise movement within said socket, means carried by said member adapted to engage the other of said overlapping elements, a spring urging said engaging means towards said element and adapted also to press together surfaces of the overlapping elements and means acting upon partial rotation of the manually operable member to lift the engaging means clear of said element to be secured.

A fastening device constructed in accordance with this invention allows the overlapping elements to disengage immediately on partial rotation of the manually operable member. It further allows the elements to be correctly located after engaging and before finally securing the fastening device.

The invention will be more fully understood by reference to the drawing which illustrates two constructional forms of the improved fastening device.

In the drawing:

Figs. 1 and 2 are longitudinal sectional views of the fastening device.

Figs. 3 to 10 and 13 and 14 are detail views of the various parts forming the fastening device illustrated in Figs. 1 and 2; Figs. 3 and 4 show the bolt; Figs. 5 to 8 show the socket and a method of constructing it from a blank; Figs. 9 and 10 show the ramp blank and the ramp ready for insertion into the socket; Fig. 13 shows a locating washer and Fig. 14 a fastening plate to be mounted on the element to be secured.

Figs. 11 and 12 show a modified arrangement of ramp and cooperating means.

Fig. 15 illustrates a modified construction.

Referring to Figs. 1 to 14: A cylindrical socket 2 is provided with wings $3_1$ and $3_2$ by which it may be riveted to a fixed element 4, conveniently a part of the structure to which a movable element 10 is to be secured.

A key shaft 1 having a T head 8 is mounted in the socket 2 for rotational and endwise displacement. A compression spring 5, mounted on the shank of the key shaft 1 between a locking washer 6 and a pin 7 carried on the key shaft 1, tends to force the key shaft 1 in the direction $f_1$.

The head 8 of the key shaft 1 is adapted in one position to pass through a hole 9 in the element 10 and through a hole in a fastening plate 11 (see Fig. 14) riveted to the said element 10. When the key shaft is rotated through a right-angle the branches $15_1$, $15_2$ of the head 8 of the key shaft 1 engage the said fastening plate 11.

Within the socket 2 a circular ramp 13 is mounted by spurs $23_1$, $23_2$ engaging slots $21_1$, $21_2$ in the end of the socket; said ramp is adapted to cooperate with spurs 14 on the key shaft 1, to displace same endwise upon rotation of the key shaft. This displacement causes the branches $15_1$, $15_2$ of the head 8 of the key shaft to engage or disengage the fastening plate 11, the engagement being assisted by the spring 5 which acts to press the overlapping elements together by forcing the head 8 in the direction $f_1$.

Means for holding the key shaft in the securing or releasing position comprises a locking washer 6 provided with spurs $18_1$ and $18_2$ which may engage slots $21_1$, $21_2$ or $22_1$, $22_2$ in the bottom of the socket 2; the slots $21_2$ also locate the ramp 13. The washer 6 is mounted on the key shaft 1 and is rotated therewith by means of a rectangular opening 25 which engages flats $17_1$, $17_2$ on the key shaft 1. The spring 5 forces the locking washer 6 in the contrary direction to $f_1$ so that the spurs $18_1$, $18_2$ engage the slots $22_1$, $22_2$ and $21_1$, $21_2$ at the positions corresponding to securing and releasing respectively.

When the fastening device is in the securing position the branches $15_1$ and $15_2$ of the head 8 of the key shaft 1 are urged towards the fastening plate 11 by the spring 5 and thus press the movable element 10 against the fixed element 4.

To release the movable element 10 a turnscrew or like tool is inserted into a slot 16 in the head 8 of the key shaft and the head 8 is rotated through a quarter turn. This brings the branches $15_1$ and $15_2$ into a position in which they may pass through the holes in the fastening plate 11 and movable element 10 to release the said movable element. At the same time the branches $15_1$ and $15_2$ are lifted from the fastening plate 11 by the action of the ramp 13 cooperating with the spur 14 to displace the key shaft 1 endwise. This displacement facilitates the securing and releasing of the movable element 10.

The socket 2 may be formed from a blank as shown in Figs. 7 and 8 or it may be formed in any other convenient way. The ramp means associated with the socket may conveniently be of the form shown in Figures 9 and 10.

A modified arrangement of the ramp and cooperating means is shown in Figs. 11 and 12 which show a ramp 13a carried on a key shaft 1a adapted for cooperation with spurs 24₁, 24₂ on the interior of a socket 2a.

A modified form of fastening device according to the present invention is illustrated in Fig. 15. A socket 42 is rigidly secured to a movable member 43. The interior of the socket 42 provides guiding means allowing rotation of a bolt 44 provided with a head 45.

The bolt 44 is urged in the direction $f_2$ by a compression spring 46 mounted on the bolt between the head 45 of the bolt 44 and the bottom of the socket 42. The lower end of the shank of the bolt 44 passes through the bottom of the socket 42 and a transverse arm 47, having two symmetrical up-turned limbs 47₁, 47₂ is secured to the part of the shank extending through the said socket 42. The limbs 47₁, 47₂ are adapted to engage depressions 48₁, 48₂ in a fastening plate 48 mounted on a fixed member 50 and, being urged upwards by the spring 46, act to press the members 43 and 50 together thereby securing them.

The head 45 of the bolt 44 is slotted at 45₁ to receive a turnscrew or like tool whereby the bolt may be rotated. The fastening plate 48 and fixed member 50 are provided with apertures which permit the socket 42, bolt 44 and arm 47 to pass through said members when the bolt is rotated through 90° from the position shown in Fig. 15 thereby disengaging the movable member 43 from the fixed member 50.

A ramp 51 formed on the lower end of the socket 42 and cooperating with a pin 49 arranged transversely of the bolt 44 acts to force the bolt 44 downwards against the action of the spring 46 to disengage the limbs 47₁, 47₂ from the depressions 48₁, 48₂ on rotation of the bolt 44. This arrangement facilitates disengagement of the device.

When the device is in the "engaged" position the head 45 of the bolt 44 is in a position generally level with the upper surface of the member 43.

What I claim is:

1. A fastening device for securing together overlapping elements by pressing surfaces of such elements into contact with each other, comprising a socket member for attachment to one of the elements and having associated ramp means, a shaft, adapted for manual rotation, axially slidable and rotatable in the socket member and having parts adapted to engage a second element to be secured, a spring operative between the socket member and the shaft to urge the latter axially to cause such engagement of said parts, and pins mounted on the shaft and cooperating with the ramp means to cause disengagement of said parts from the second element on partial rotation of the shaft.

2. A fastening device for securing together overlapping elements by pressing surfaces of such elements into contact with each other, comprising a socket member for attachment to one of the elements, ramp means associated with the socket member, a shaft carried in the socket member and having a T shaped head adapted for manual rotation and adapted, in one rotational position, to engage a second element to be secured, a spring acting axially between the shaft and the socket member to urge said head into engagement with said second element and pins mounted on the shaft and cooperating with the ramp means, on partial rotation of the shaft, to displace the latter axially against the action of the spring.

3. A fastening device for securing together overlapping elements by pressing surfaces of such elements into contact with each other, comprising a socket member for attachment to one of the elements, ramp means associated with the socket member, a shaft carried in the socket member and having a T shaped head adapted for manual rotation and adapted, in one rotational position, to engage a second element to be secured, a spring acting axially between the shaft and the socket member to urge said head into engagement with said second element, and a toothed plate mounted on the shaft and urged by the spring to engage depressions in the end of the socket member to locate the shaft in the free or in the locked position.

4. A fastening device for securing together overlapping elements by pressing surfaces of such elements into contact with each other, comprising a socket member for attachment to one of the elements, and having associated ramp means, a shaft having a head adapted for manual rotation, axially slidable and rotatable in the socket member and provided with a transverse part having limbs adapted in one position to engage a second element to be secured, a spring operative between the socket member and the shaft to urge the latter axially to cause such engagement of said limbs, and pins mounted on the shaft and cooperating with the ramp means to cause disengagement of said limbs from the second element on partial rotation of the shaft.

JACQUES FRANCOIS GABRIEL CHOBERT.